United States Patent
De Bruycker et al.

(10) Patent No.: US 11,265,997 B2
(45) Date of Patent: Mar. 1, 2022

(54) LIGHTING DEVICE FOR POWERING FROM A MAIN POWER SUPPLY AND AN AUXILIARY POWER SUPPLY

(71) Applicant: SIGNIFY HOLDING B.V., Eindhoven (NL)

(72) Inventors: Patrick Alouisius Martina De Bruycker, Neunen (NL); Haico Storms, Eindhoven (NL); Nick Welbers, Urmond (NL)

(73) Assignee: SIGNIFY HOLDING B.V., Eindhoven (NL)

( * ) Notice: Subject to any disclaimer, the term of this patent is extended or adjusted under 35 U.S.C. 154(b) by 483 days.

(21) Appl. No.: 16/325,868

(22) PCT Filed: Aug. 11, 2017

(86) PCT No.: PCT/EP2017/070472
§ 371 (c)(1),
(2) Date: Feb. 15, 2019

(87) PCT Pub. No.: WO2018/036845
PCT Pub. Date: Mar. 1, 2018

(65) Prior Publication Data
US 2019/0191534 A1    Jun. 20, 2019

(30) Foreign Application Priority Data

Aug. 22, 2016   (EP) .................................... 16185066

(51) Int. Cl.
*H05B 47/19*      (2020.01)
*H05B 45/50*      (2020.01)
(Continued)

(52) U.S. Cl.
CPC .............. *H05B 47/19* (2020.01); *H02J 9/061* (2013.01); *H05B 45/50* (2020.01); *H05B 47/195* (2020.01); *F21K 9/20* (2016.08); *F21Y 2115/10* (2016.08)

(58) Field of Classification Search
CPC .. H05B 37/0272; H02J 9/061; F21Y 2115/10; F21K 9/20
See application file for complete search history.

(56) References Cited

U.S. PATENT DOCUMENTS

2011/0133649 A1   6/2011  Kreiner et al.
2014/0265845 A1*  9/2014  Williams ............... H05B 47/17
                                                315/86
(Continued)

FOREIGN PATENT DOCUMENTS

CA    2660388          9/2010
EP    2028754 B1       9/2010
(Continued)

OTHER PUBLICATIONS

John DiGeronimo, EIC 2800 Search Report, Jan. 6, 2020, Scientific and Technical Information Center (Year: 2020).*

*Primary Examiner* — Raymond R Chai

(57) ABSTRACT

A lighting device (10) for operating from a main power supply or from an auxiliary power supply (25), in co-operation with a switching device transmitting a wireless control signal indicative of a power condition of the main power supply. The lighting device (10) accommodates in a single housing (11) a light emitting module (20), the auxiliary power supply (25) and a control circuit (30) for monitoring the wireless control signal and a power condition of the main power supply at the lighting device (10). The control circuit (30) is to operate the lighting device from the auxiliary power supply if both the monitored power condition and the control signal indicate absence of power, and is (Continued)

to deactivate the powering from the auxiliary power supply (25) if the monitoring reveals presence of power of the main power supply.

13 Claims, 3 Drawing Sheets

(51) Int. Cl.
*H05B 47/195* (2020.01)
*H02J 9/06* (2006.01)
*F21K 9/20* (2016.01)
*F21Y 115/10* (2016.01)

(56) References Cited

U.S. PATENT DOCUMENTS

| | | | |
|---|---|---|---|
| 2014/0320011 A1 | 10/2014 | Hegarty | |
| 2015/0028800 A1* | 1/2015 | Kim | H02J 50/10 |
| | | | 320/108 |
| 2015/0296599 A1* | 10/2015 | Recker | H05B 47/16 |
| | | | 315/153 |
| 2016/0141914 A1 | 5/2016 | McBryde et al. | |
| 2017/0051886 A1* | 2/2017 | Liu | H05B 45/10 |

FOREIGN PATENT DOCUMENTS

| | | |
|---|---|---|
| EP | 2866529 B1 | 7/2017 |
| GB | 2447495 A1 | 9/2008 |
| JP | 2015232990 A | 12/2015 |

\* cited by examiner

LIGHTING DEVICE FOR POWERING FROM A MAIN POWER SUPPLY AND AN AUXILIARY POWER SUPPLY

CROSS-REFERENCE TO PRIOR APPLICATIONS

This application is the U.S. National Phase application under 35 U.S.C. § 371 of International Application No. PCT/EP2017/070472, filed on Aug. 11, 2017 which claims the benefit of European Patent Application No. 16185066.4, filed on Aug. 22, 2016. These applications are hereby incorporated by reference herein.

FIELD OF THE INVENTION

The present invention generally relates to the field of lighting and, more particularly, to a lighting device for being powered from a main power supply and an auxiliary power supply, such as a retrofit tube type or bulb type solid-state lighting device. The present invention further relates to a power monitoring unit, a lighting system comprised of at least one lighting device and a switching device, as well as to a method of operating such a lighting device.

BACKGROUND OF THE INVENTION

Emergency lighting typically assists in exiting a building or other area in the event of a power or mains outage or other emergency situation, by providing an amount of light that is sufficient to find and/or follow a path to an emergency exit, for example.

An emergency lighting system generally consists of a plurality of lighting devices or light sources, separate from the general lighting in a building or area, and connected to an auxiliary power supply, typically a stand-by emergency battery or stand-by generator. These emergency lighting devices or light sources are switched on, i.e. start lighting, in the event of an outage of the electricity network or mains in a building or area.

In practice, such emergency lighting requires dedicated hard wired power and switching lines or life wire dedicated to emergency lighting, which can be expensive to install, in particular if the building or area has not previously been provided with emergency lighting. In addition, dedicated luminaire for emergency lighting add to the costs in terms of luminaires.

An example of emergency system is shown in US2015/0296599. In this document the system use a central controller which is capable to send wire or wireless command to emergency lighting device for toggle them into emergency mode. Such a system need a grid monitoring controller capable to communicate with emergency device when the power grid fails.

Canadian patent application 2,660,388 discloses a so-called wireless convenience lighting system, to provide convenience lighting and/or emergency lighting for illuminating a path of egress in case of loss of mains power. The system is comprised of battery powered lighting units an a plug-in wall unit, that are in wireless communication with each other. The plug-in wall unit is arranged for monitoring loss of mains power.

In operation, when the plug-in wall unit connects to the mains, loss of mains power is sensed and signalled by the plug-in wall unit to the lighting units that, in turn, start lighting.

This known wireless convenience lighting system provides a fast and easy installation of a convenience or emergency light, and solves the drawback of requiring a hard wired connection, including a life wire dedicated to emergency lighting. However, the lighting device only operates with, i.e. listens to the plug-in wall unit for switching into the convenience or emergency lighting mode of operation. If the plug-in wall unit is out-of-order or even missing, dependent from the particular mode of operation, i.e. whether the lighting device is switched on by actively receiving a command or in the absence of the receipt of a signal, either the emergency light will not switch on in case of a main power outage or the emergency light will enter the emergency mode also when there is no power outage and will not switch off. That is, the device does not operate in case of a power outage or the on-board battery will drain in the absence of an emergency and, eventually, with an empty battery the device neither functions properly in case of a main power outage.

SUMMARY OF THE INVENTION

It is an object of the present invention to provide for convenience and/or emergency lighting, such as convenience and/or emergency lighting in buildings or areas not equipped with or prepared for such convenience and/or emergency lighting, not requiring dedicated hard-wired power and switching lines to be installed and avoiding operation in emergency mode when the main power supply is available.

It is another object of the invention to provide for convenience and/or emergency lighting not requiring additional luminaires to be installed in a building or area.

In a first aspect the present invention provides a lighting device comprising terminals for connecting a main power supply, the lighting device comprising:
  a light emitting module,
  a control circuit for monitoring a wireless control signal indicative of a power condition of the main power supply and for monitoring a power condition at the terminals, and
  an auxiliary power supply for powering the lighting device.

In accordance with the invention, the control circuit is configured for powering the lighting device from the auxiliary power supply based on simultaneous absence of power on the monitored power condition at the terminals and absence of receipt of the wireless control signal.

The lighting device according to the invention is equipped for both an ambient or general lighting mode of operation, and a convenience or emergency lighting mode of operation, for example, in the case of loss of power of the main power supply by comprising a dedicated auxiliary power supply. The auxiliary power supply is operated through the control circuit that monitors the power condition at the power terminals and a wireless control signal. Accordingly, separate power and/or signalling lines for convenience or emergency lighting mode are effectively avoided for operating the lighting device of the invention, as well as separate luminaire for providing convenience or emergency lighting.

In its most general application, the lighting device is capable to automatically toggle between being powered from the main power supply and being powered from the auxiliary power supply. In the present description, powering from the main power supply is generally indicated as operating in an ambient or general lighting mode, and powering from the auxiliary power supply is generally indicated as operating in a convenience or emergency lighting mode.

When the lighting device, at the time of loss of power from the main power supply is off, i.e. not powered from the main power supply, the convenience or emergency lighting mode is to be automatically switched on and off by the control circuit based on the control signal representing absence of power from the main power supply.

As the control circuit monitors the availability of power from the main power supply by monitoring the power condition at the power terminals of the lighting device, operation in the convenience or emergency mode is to be effectively avoided as long as availability of the main power supply is sensed or monitored at the terminals, thereby avoiding unnecessary energy drainage from the auxiliary power supply when there is no power outage, for example. Thus, false detection of an emergency power outage is effectively avoided.

When operating in the ambient or general lighting mode at the time of loss of power from the main power supply, independent of the condition of the auxiliary power supply and/or the control signal, the lighting device is to automatically return to the ambient or general lighting mode once the control circuit senses return of power from the main power supply at the terminals of the lighting device, and at the same time ceases the convenience or emergency lighting operation.

In an embodiment of the invention, the auxiliary power supply comprises at least one rechargeable battery. The rechargeable battery or batteries are advantageously to be operated such that if the lighting device is switched on and powered by the main power supply, same are charged. Accordingly, each time when the lighting device is switched on, the rechargeable battery or batteries making up the auxiliary power supply are charged and thereby kept in a condition for powering convenience or emergency lighting, when required.

For operation as convenience or emergency lighting, in general, the amount of light to be provided needs to be a fraction of ambient lighting required on a work floor or an office desk, for example. For safety reasons, in convenience or emergency mode, official regulations or rules may require a minimum amount of light to be provided during a minimum operating time.

While the lighting device according to the invention may be operated by any known type of light emitting module or light source, such as low-voltage halogen type lighting, for example, that may be directly powered from a battery type auxiliary power supply for producing a minimum required amount of light, or an incandescent lamp or fluorescent type lamp, whether or not with an intermediate voltage booster, to avoid costly and voluminous batteries to meet a minimum operating time in convenience or emergency mode of operation, in an embodiment according to the invention, the light emitting module comprises a plurality of light emitting diodes, LEDs, and wherein the lighting device comprises a main driver circuit for powering the light emitting module from a main power supply.

Owing to their long lifetime and high energy efficiency, lighting devices comprising an LED light emitting module, are replacing traditional incandescent bulb and fluorescent Tube Light, TL, lamps, for retrofit applications. For such applications, the solid-state retrofit lamp is typically adapted to fit into the socket of the respective lamp fixture to be retrofitted. In practice, LED retrofit lamps are available for readily any type of traditional or common fixture.

Solid-state light sources, such as LEDs, typically exhibit a high luminous efficacy while drawing less current from a power supply for a given luminous flux compared to traditional incandescent and fluorescent lamps. For this reason, solid-state light sources are advantageous for emergency and/or convenience lighting.

In a further embodiment of the invention, the lighting device comprises a further driver circuit configured for lighting a reduced number of the light emitting diodes if powered by the auxiliary power supply, compared to being powered by the main power supply.

The number of LED that are powered in convenience or emergency mode of operation may be pre-selected by the manufacturer of the lighting device, or user settable, for example dependent on respective regulations for emergency lighting. In an advanced mode of operation, the number of LED to be lightened may dynamically vary, based on the time of operation and the power condition of the auxiliary power supply, such that the number is reduced the longer the lighting device operates in convenience or emergency mode.

In a further embodiment of the invention, the lighting device comprises a status indicator light emitting diode, wherein the control circuit is arranged to operate the status indicator light emitting diode indicative of at least one of a power condition of the auxiliary power supply and a power condition of the main power supply indicated by the control signal.

The status indicator LED may be operated such that same is blinking, for example, when the auxiliary power supply is in a condition sufficient for or insufficient for providing convenience or emergency lighting as required. The status indicator LED may also be operated, for example by continuously lighting up, for indicating malfunctioning of the control circuit and/or the control signal, for example indicating absence of power from the main power supply while the lighting device operates in the ambient or general lighting mode of operation.

In an embodiment of the lighting device, the control circuit may comprise a voltage sensor for detecting the power condition of the main driver circuit representing absence of power of the main power supply if a voltage sensed by the voltage sensor at the main driver circuit is below a set first threshold voltage, and for detecting the power condition of the main driver circuit representing presence of power of the main power supply if a voltage sensed by the voltage sensor at the main driver circuit is above the set first threshold voltage.

The voltage sensor may also sense the voltage level of the main power supply at the input terminals of the main driver circuit. Then, the first threshold voltage may be set at a minimum voltage level taking into account spurious voltages or stray voltages that may temporarily remain present in the electricity grid or mains in case of a power outage, for example.

In an embodiment of the lighting device according to the invention, the control circuit comprises a receiver for receiving the control signal. The receiver may operate with a processor for monitoring the power condition of the main driver circuit and the control signal received by the receiver. The processor may be configured for activating and deactivating powering of the light emitting module from the auxiliary power supply by controlling the further driver circuit in case of an LED type light emitting module, for example.

It will be appreciated that a processor operated control circuit provides a versatile monitoring operation of the lighting device for activating the convenience or emergency mode, such to comply with official regulations and specific user demands, for example.

The wireless control signal may be any of a radio or radio-frequency, RF, signal or an infra-red, IR, signal, for example, operated in accordance with a standardized or proprietary signalling protocol. Further, as will be appreciated by those skilled in the art, the control signal may be robustly arranged such that availability of the control signal indicates availability of power of the main power supply and absence of the control signal indicates absence of power of the main power supply, or the other way around.

In a further embodiment of the lighting device according to the invention, the receiver is a radio receiver for receiving a radio control signal In the event of operation of the receiver in connection with a processor, the processor may be configured for determining the power condition of the main power supply representing absence of power in the absence of receipt of the control signal by the receiver, and for determining the power condition of the main power supply representing presence of power at receipt of the control signal by the receiver.

This is advantageous for minimizing power consumption from the auxiliary power supply, such that in the convenience or emergency mode of operation, the receiver may be intermittently switched on and off, for example. Absence of the control signal while power of the main power supply is available at the terminals of the lighting device will not invoke the convenience or emergency mode of operation, as explained above, but provides a safety indication of malfunctioning of the control signal and/or control circuit, and may be signalled, for example, through the status indicator LED, if available.

The light emitting module, a main driver circuit, the control circuit, the auxiliary power supply and a further driver circuit may be integrally accommodated in a housing of a lighting device according to the invention, such as a light transmissive housing or a partly light transmissive housing, configured as a retrofit tube type or bulb type lighting device, for example.

In a second aspect, the present invention provides a switching device for operation with a lighting device in accordance with the invention as disclosed above. The switching device comprising a housing accommodating a switch for making and breaking a power line from a main power supply for powering a lighting device, the switch having terminals for connecting the power supply and lighting device, a power monitoring circuit for monitoring a power condition at the terminals, and a transmitter for wirelessly transmitting a control signal indicative of the presence of power by the power monitoring circuit.

The second aspect of the invention advantageously combines a power monitoring circuit for monitoring the power condition of the main power supply, a transmitter for wirelessly transmitting a control signal indicative of the monitored power condition, and a switch, either a manually or remotely operated switch, for switching the lighting device on and off. Thereby effectively avoiding several units that have to be installed separately. It will be appreciated that by incorporating the power monitoring circuitry including the transmitter in a switching device that is anyhow required for switching the lighting device in its ambient or normal working mode, loss of a separate plug-in unit as discussed in the background part is effectively avoided, for example.

The term switch includes any type of circuit maker or breaker like a manually operated mechanical switch, a remotely operated relay like a teleruptor, a timing relay, a solid state switch such as a bipolar transistor or field effect transistor, or any other type of switching device.

As disclosed above, the lighting device of the invention is to operate in convenience or emergency mode when both the power condition of the main driver circuit and the control signal represent absence of power of the main power supply. In an embodiment of the switching device according to the second aspect of the invention, effective use is made of this feature in that the power monitoring circuit and the transmitter are configured for interrupting transmission of the control signal, in absence of power of the main power supply, in the event of a power outage of the main power supply as well as when the switch is in its current conducting or making state.

That is, when the lighting device is switched on by setting the switch in its current conducting or closed state, operation of the transmitter is interrupted. Assuming that the main power supply is available, this interruption of the control signal will not invoke the convenience or emergency lighting mode of the lighting device, because by turning the switch on, the main driver circuit of the lighting device is powered from the main power supply, which will be sensed by the control circuit of the lighting device.

In an embodiment, the switching unit comprises a capacitive power supply unit connected across the terminals, for powering the transmitter. In a simple embodiment, the capacitive power supply unit may comprise a capacitor that is able to store sufficient electric energy for supplying electric power to the electronic components of the switching device in case of power glitches or the like of the main power supply, which may lead to a temporarily reduced voltage across the terminals of the switch. Thus, the capacitive power supply unit, among others, prevents toggling of the lighting device in the one or the other mode of operation due to power glitches or short power dips across the terminals of the switch and thereby effectively avoids false power outage detection.

In an embodiment, the position or switching state of the switch is monitored in that the powering monitoring circuit comprises a voltage sensor for sensing a voltage across the terminals. If a voltage sensed by the voltage sensor across the switch terminals is below a set second threshold voltage, the switch is assumed to be closed. If the voltage across the terminals of the switch is above the set second threshold voltage the switch is assumed to be open, i.e. not conducting current for operating the lighting device in its ambient or general mode of operation. The second threshold voltage may be set at a minimum voltage level taking into account spurious voltages or stray voltages that may temporarily remain present across the switch in the event of a power outage.

In case of loss of power of the main power supply while the switch is turned on, the control circuit is to automatically invoke the convenience or emergency mode of operation of the lighting device in case of both absence of the control signal and absence of power of the main power supply at the terminals of the lighting device.

In a further, operatively robust, embodiment of the switching device according to the invention, the transmitter is a radio transmitter configured to transmit a radio control signal, for example if the voltage sensed by the voltage sensor is above the second threshold voltage and, for example, to cease transmission of the control signal if the voltage sensed by the voltage sensor is below the set second threshold voltage.

Accordingly, the power monitoring circuit and the transmitter may be powered from the voltage across the terminals of the switch when same is not closed, thereby effectively avoiding an additional auxiliary power supply for powering the circuitry of the switching device. Advantageously, if the switch is closed, i.e. in its current conducting state, the electronic circuitry of the switching device connected across or parallel with the terminals of the switch will not consume electric power.

In a third aspect, the invention provides a solid-state lighting system, comprising at least one lighting device in accordance with the first aspect of the invention and at least one switching device in accordance with the second aspect of the invention, disclosed above.

In a fourth aspect the invention provides a method of operating of a lighting device comprising a light emitting module configured for being powered from one of a main power supply and an auxiliary power supply, the method comprising the steps of:

monitoring a wireless control signal indicative of a power condition of the main power supply, monitoring a power condition of the main power supply at the lighting device, powering of the light emitting module from the auxiliary power supply based on simultaneous absence of power on the monitored power condition at the lighting device and absence of receipt of the monitored control signal.

The method may be effectively performed by a suitably programmed processor or programmable controller, such as a microprocessor or microcontroller provided with the lighting device.

In an embodiment of the method of the invention, the step of powering comprises powering of the light emitting module by the auxiliary power supply when monitoring absence of both the control signal and power of the power supply at the lighting device, i.e. at the power terminals thereof.

In another embodiment, a further step is implemented of deactivating powering of the light emitting module from the auxiliary power supply when monitoring presence of at least one of power of the power supply at the lighting device and the control signal.

For power saving in convenience or emergency lighting mode of operation, when the light emitting module comprises a plurality of light emitting diodes, in an embodiment the method further comprises lighting of a reduced number of the light emitting diodes if powered from the auxiliary power supply compared to being powered from the main power supply.

These and other aspects of the invention will be apparent from and elucidated with reference to the embodiment described hereinafter.

DETAILED DESCRIPTION

Figure 1:
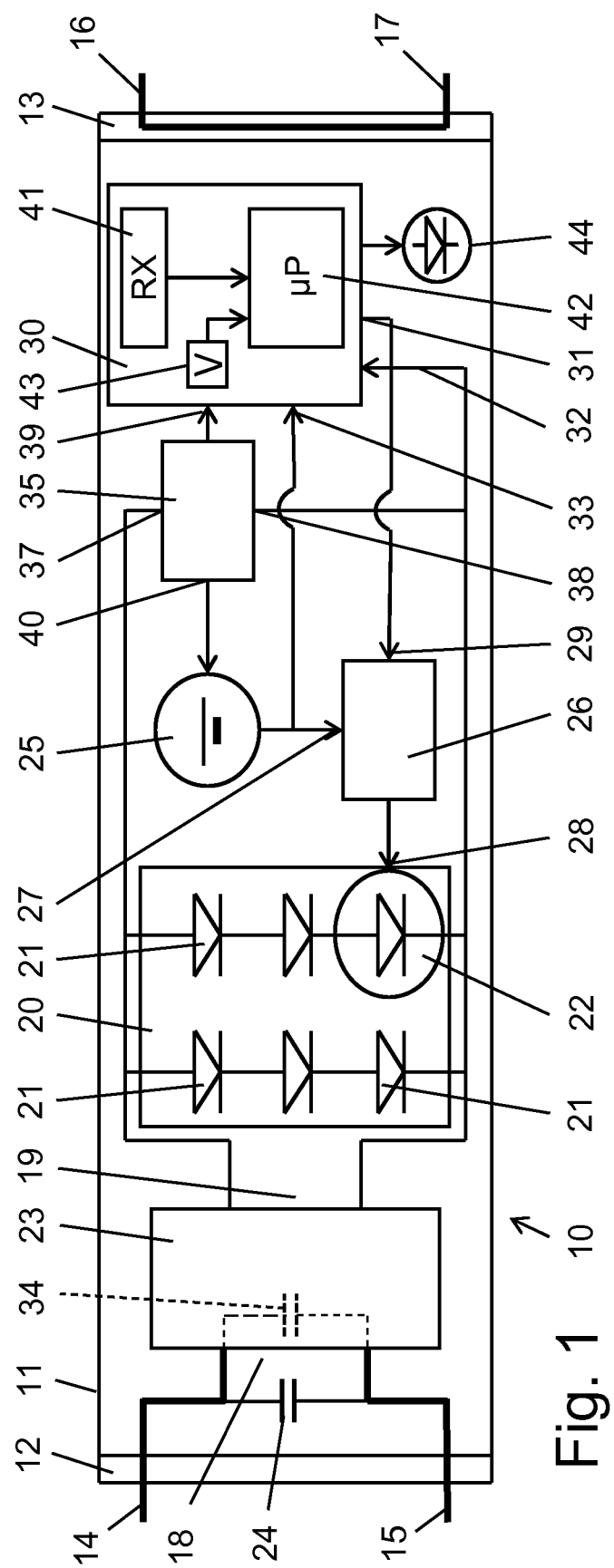
FIG. 1 shows an electrical circuit diagram of an example of a lighting device in accordance with an embodiment of the invention.

Reference numeral 10 in FIG. 1 designates a lighting device in accordance with an embodiment of the invention, comprised of an elongated light transmissive housing 11, such as a housing made of glass, configured as a retrofit tube type lighting device. At each outer end 12, 13 the housing 10 comprises two outwardly of the housing extending electrically conducting pen shaped terminals 14, 15 and 16, 17, respectively, for support of the lighting device 10 in a lighting fixture (not shown) and for electrically powering of the lighting device 10.

It will be appreciated that the housing 11 may also take the form of light bulb or other conventional or required shape and the power terminals 14-17 may be suitably shaped for contacting a respective conventional connector of a light fixture for retrofit applications, for example.

The housing 11 accommodates a light emitting module 20, such as a light emitting module 20 comprised of a plurality of series and parallel connected light emitting diodes, LEDs, 21. Although shown at an end of the housing 11, those skilled in the art will appreciate that in a practical embodiment the LEDs are distributed and spaced apart across the length of the housing 11, to provide an evenly as possible lighting by the lighting device 10 over its entire length.

The light emitting module 20 is powered through a main driver circuit 23 in the housing 11, a power input 18 of which electrically connects to the terminals 14, 15 for receiving electrical power from a main power supply (not shown), such as the electricity grid or mains. A power output 19 of the main driver circuit 23 electrically connects to the light emitting module 20.

The main driver circuit 23 operates, among others, to reduce and rectify an AC voltage of the main power supply, such as 230 V mains voltage, to a DC voltage suitable for powering of the LEDs 21, and for driving the LEDs 21 to emit light of a pre-selected colour and/or for emitting light of a colour to be selected by a user. Driver circuits of this type, for use with the invention, are generally know in practice such that any detailed elaboration thereon is omitted.

Instead of a solid state light emitting module 20, the lighting device 10 may comprise any known type of light emitting module or light source, such as low-voltage halogen type lighting, an incandescent lamp or fluorescent type lamp operating at mains voltage, for example, whether or not directly connected to the power terminals 14, 15 of the lighting device 10.

The housing 11 further accommodates an auxiliary power supply 25 and a further driver circuit 26. The further driver circuit 26 connects to receive electrical power from the auxiliary power supply 25 at a power input 27, and for powering the light emitting module 20 from a power output 28 of the further driver circuit 26. In the embodiment shown, the further driver circuit 26 is arranged to power a single LED or a fraction of the plurality of LEDs 21 of the light emitting module 20, schematically represented by reference numeral 22.

The auxiliary power supply 25 may directly output a DC voltage and may be comprised, for example, of one or a plurality of general purpose low voltage rechargeable batteries, of a size that fits in a housing 10 of conventional dimensions for retrofit applications. Driver circuits 26 for powering LEDs from a low voltage auxiliary supply for use with the present invention are likewise generally know in practice such that any detailed elaboration thereon is also omitted.

In case of a light emitting module 20 comprised of other than LED light sources, like an incandescent or fluorescent type lamp operating a 230 V mains voltage, for example, the further driver circuit may comprise a booster for up-converting the voltage of the auxiliary power supply 25 to a voltage for operating such light sources at a minimum light level required for emergency or convenience lighting.

The housing 11 further comprises a control circuit 30, a control output 31 of which connects to a control input 29 of the further driver circuit 26, for activating the further driver circuit 26 to power the lighting module 20, i.e. one or plurality of LED 22 thereof, in a convenience or emergency lighting mode of operation of the lighting device 10, from the control output 28.

The control circuit 30 comprises a monitoring input 32 for monitoring a power condition of the main driver circuit 23 and hence the power condition of a main power supply at the power input 18, i.e. the power terminals 14, 15 of the lighting device 10, for powering the main driver circuit 23. In the embodiment shown, the control circuit 30 also monitors power at an output 39 of a DC-DC converter 35, having power input terminals 37, 38 connected to the power output 19 of the main driver circuit 23. The converter 35 is arranged for charging rechargeable batteries of the auxiliary power supply 25 through a power output 40 of the converter 35 when the main driver circuit is 23 powered from a main power supply. In the embodiment shown, a power input 33 of the control circuit 30 connects to receive electrical power from the auxiliary power supply 25. Although not explicitly shown, the control circuit 30 may additionally be powered by the DC-DC converter 35. Although not shown, in the absence of the main driver circuit, the monitoring input 32 may directly connect to any of the power terminals 14, 15 of the lighting device 10.

Figure 2:
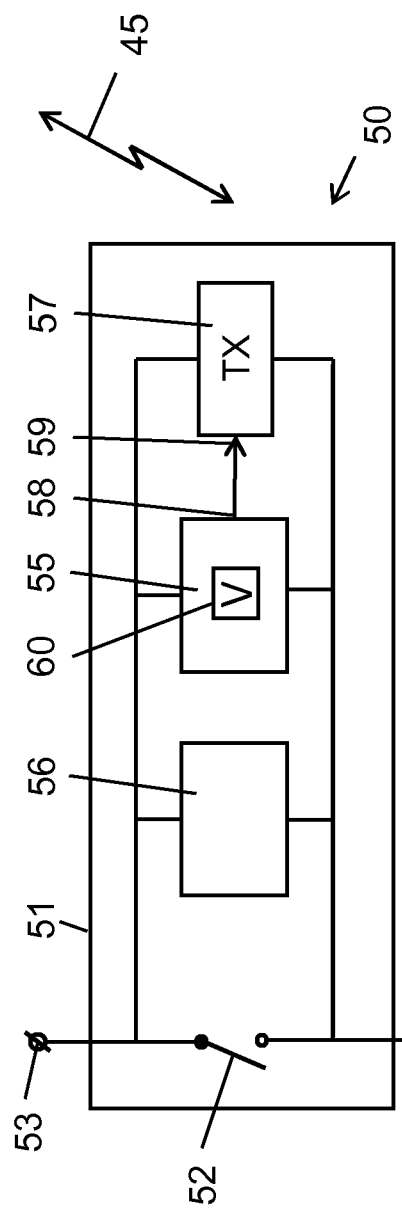
FIG. 2 shows an electrical circuit diagram of an example of a switching device in accordance with an embodiment of the invention.

The control circuit 30 is further arranged for monitoring a wireless control signal 45 indicative of a power condition of the main power supply for powering the lighting device 10, such as a wireless control signal transmitted by a remote switching device 50, an embodiment of which according to the invention is shown in FIG. 2.

To this end, the control circuit 30 comprises a receiver 41 for receiving the wireless control signal 45 and a processor, such as a microcontroller or microprocessor, μP, 42 for monitoring the control signal 45 received by the receiver 41. The wireless control signal 45 may comprise any of a radio or radio-frequency, RF, signal or an infra-red, IR, signal, for example, operated in accordance with a standardized or proprietary signalling protocol. In practice, wireless radio transmission technologies available for use with the invention are, inter alia, ZigBee™ Light Link, Bluetooth™, and WiFi based protocols. The processor 42 is optional.

The purpose of the control signal 45 is to provide the control circuit 30 with information relating to the power condition of the main power supply to which, in operation, the lighting device 10 connects. Although this information may be very sophisticated and forwarded, for example, as a carrier modulated digital data signal, for providing convenience or emergency lighting by the lighting device 10, it is basically sufficient to inform the control circuit 30 whether power of the main power supply is available or not, i.e. if there is a power outage. In an operatively robust embodiment of the invention, the control signal 45 may take the form a beacon signal, the absence of presence of which indicates one of power availability or absence of power of the main power supply.

In the embodiment of the invention shown in FIG. 1, the control circuit 30 comprises a radio receiver, RX, 41 for receiving a wireless radio control signal 45, arranged such that absence of the control signal at the receiver 41 corresponds to absence of power of the main power supply, and in that receipt of the control signal 45 by the receiver 41 corresponds to availability of power of the main power supply.

The output of the receiver 41 is evaluated by the microcontroller or microprocessor 42 together with information about the power condition of the main power supply at the main driver circuit 23, received at the monitoring input 32 of the control circuit 30. In an embodiment of the invention, to this end, the control circuit 30 comprises a voltage sensor, V, 43 for sensing a voltage supplied by the converter 35 indicative of a voltage of the main power supply at the power input 18 of the main driver circuit 23.

The microcontroller or microprocessor 42 is arranged to compare the voltage sensed by the voltage sensor 43 with a set or user settable first threshold voltage. For example such that absence of power of the main power supply is detected if a voltage sensed by the voltage sensor 43 is below a set first threshold voltage, and presence of power of the main power supply is detected if a voltage sensed by the voltage sensor 43 is above the set first threshold voltage.

As mentioned above, the first threshold voltage may be set such taking into account spurious voltages or stray voltages that remain present in the electricity grid or mains in case of a power outage, for example. Voltage sensors, or in general sensors for sensing the presence of power of a power supply suitable for use with the present invention are generally known and commercially available.

The control circuit 30 further operates a status indicator light emitting diode 44. That is, the control circuit is arranged to operate the status indicator light emitting diode 44 indicative of at least one of a power condition of the auxiliary power supply 25 and a power condition of the main power supply indicated by the control signal 45.

The number of LEDs 22 to be powered by the further driver circuit 26 and the power capacity of the auxiliary power supply 25 may be selected in accordance with governmental regulations for convenience or emergency lighting, inter alia specifying a minimum operating time for continuous convenience or emergency lighting and the amount of light to emit. Such as emitting a luminous flux of 10 lux during 90 minutes continuous operating time.

In FIG. 2, reference numeral 50 designates a switching device for operation with a lighting device, such as the lighting device 10 in accordance with an embodiment of the invention.

The switching device 50 in the embodiment of the invention shown in FIG. 2, comprises a housing 51 accommodating a switch 52 for making and breaking a power line from a main power supply to the lighting device 10 or a plurality of lighting devices 10, for example, a power monitoring circuit 55 for monitoring a power condition of the main power supply, a transmitter, TX, 57 for wirelessly transmitting a control signal 45 indicative of a monitored power condition of the main power supply by the power monitoring circuit 55.

In the embodiment shown in FIG. 2, the switch 52 comprises terminals 53, 54 for connecting a live power line of the main power supply and a connecting line or hook-up line from the switch 52 to, for example, terminal 15 of the lighting device 10, the other terminal 14 is to be connected to the neutral of the main power supply, for example. The power monitoring circuit 55, the transmitter 57 and a capacitive power supply unit 56 connect in parallel across the switch 52, i.e. the terminals 53, 54 thereof. The capacitive power supply unit 56 comprises an electric charge storage element, such as an electrolytic capacitor, for example, for storing electric charge available from the main power supply when connected to the power input 18 of the main driver circuit 23 of the lighting device 30, when the switch 52 is open, i.e. in its non-conducting state as shown in FIG. 2.

For ensuring a current conduction path with the electronic circuitry of the switching device 50 when the switch 52 is open, i.e. not conducting, a so-called bleeder capacitor 24 or bleeder resistor is connected between the terminals 14, 15 of the lighting device 10. As indicated by dashed line 34, such a bleeder capacitor or resistor may also be incorporated in the main driver circuit 23. In practice, such a bleeder capacitor 24 may already be present in the lighting for power factor correction purposes or radio interference suppression, for example. Of course, the main driver circuit 23 may be particularly designed for providing a current path through its input 18.

When properly installed, in the open or non-conducting state of the switch 52, the voltage across the terminals 53, 54 provided by the main power supply is sufficient for operation of the power monitoring circuit 55 and the transmitter 57. The capacitive power supply unit 56 temporarily supplies electric power for powering of the power monitoring circuit 55 and the transmitter 57 thereby smoothening out any voltage dips across the terminals 53, 54 of the switch 52 not caused by a power outage of the main power supply.

A control output 58 of the power monitoring circuit 55 connects to a control input 59 of the transmitter 57. The transmitter 57 may be any of a radio or radio-frequency, RF, transmitter or an infra-red, IR, transmitter for transmitting the control signal 45 as radio signal or an infra-red signal, for example. The transmitter 57 may operate in accordance with a standardized or proprietary signalling protocol. In practice, wireless radio transmission technologies available for use with the invention are, inter alia, ZigBee™ Light Link, Bluetooth™, and WiFi based protocols.

In an embodiment of the invention, the power monitoring circuit 55 comprises a voltage sensor, V, 60 for sensing a voltage across the terminals 53, 54 of the switch 52, such that absence of power of the main power supply is determined if a voltage sensed by the voltage sensor 60 is below a set second threshold voltage and presence or availability of power of the main power supply is determined if a voltage sensed by the voltage sensor 60 is above the set second threshold voltage.

In an operatively robust embodiment of the switching device 50, the power monitoring circuit 55 and the transmitter 57 are configured for interrupting transmission of the control signal 45 by the transmitter 57 representing absence of power of the main power supply in case of a power outage of the main power supply, as well as when the switch 52 is in its current conducting or making state. Thus, the transmitter 57 operates in a beacon mode of operation, as explained above with reference to the receiver 41. Interruption of the transmission of the control signal by the transmitter is controlled through suitable signalling exchange at the control output 58 of the power monitoring circuit 55 and to control input 59 of the transmitter 57.

Although not explicitly shown in FIGS. 1 and 2, the transmitter 57 and receiver 41 operating as radio transmitter and radio receiver, respectively, may comprise suitable transmit and receive antennas. For improving receipt of the radio control signal 45, the transmitter 57 and receiver 41 may use the connecting line or hook-up line from the switch 52 to the lighting device 10 as antenna, for example.

It will be appreciated that in the case of a solid-state lighting system for ambient and emergency or convenience lighting, comprised of at least one lighting device 10 and at least one switching device 50 in accordance with embodiments of the invention, the operating protocol and signalling exchanged between the transmitter 57 and receiver 41 have to be matched and installed, such to operate from a same main power supply.

In a practical embodiment, the housing 51 of the switching device 50 may be designed as a commonly known electric switch for flush wall mounting or surface wall mounting, for example.

An embodiment of a method of operation of the invention will now be explained with reference to the simplified flow chart diagram 70 shown in FIGS. 3*a* and 3*b* and the embodiments of the lighting device 10 and the switching device 50, shown in FIGS. 1 and 2, respectively. The direction of flow in the flow chart diagram 70 is assumed from the top to the bottom of the sheet. Other flow directions are indicated by a respective arrow. The method is implemented in and performed by a suitable software program or code, executed in the microcontroller or micro-processor 42 of the lighting device 10.

Figure 3A:
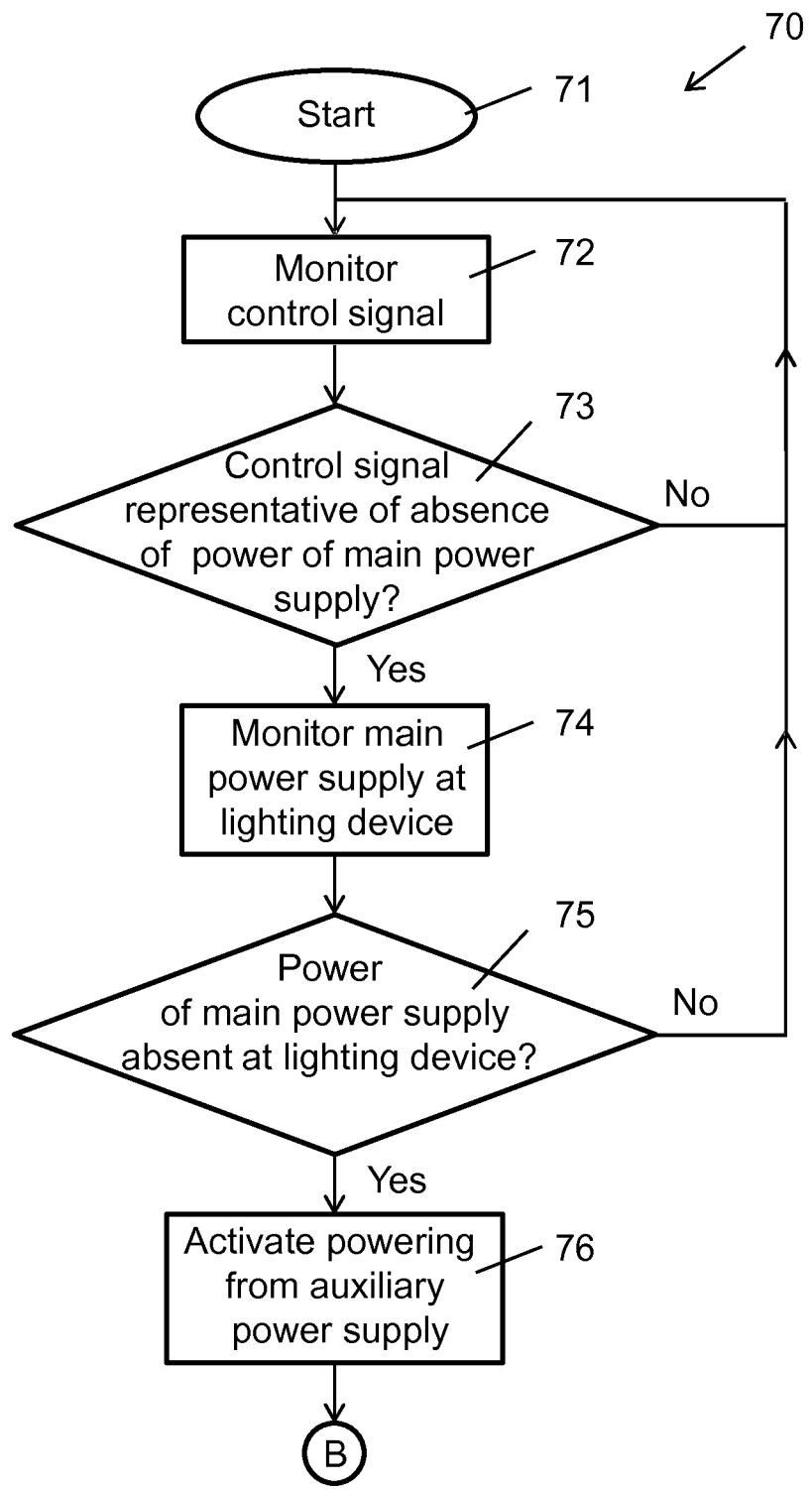
FIGS. 3a and 3b show a simplified flow chart diagram illustrating an example of the steps performed in a method according to an embodiment of the invention.

The method is assumed to start, i.e. reference numeral 71 "Start", as shown in FIG. 3*a*, with monitoring, by the control unit 30 of the wireless control signal 45 transmitted by the transmitter 57 of the switching device 50, i.e. block 72 "Monitor control signal". The wireless control signal 45 is indicative of a power condition of a main power supply for operating the lighting device 10 in an ambient or general lighting mode of operation.

In decision block 73 "Control signal representative of absence of power of main power supply?" the operational state or condition of the main power supply is determined. If the control signal represents availability of the main power supply, i.e. result "No" of decision block 73, no action needs to be taken and the monitoring of the control signal may continue.

If the control signal 45 represents loss of power of the main power supply, i.e. result "Yes" of decision block 74, the power condition of the main power supply power at the power input 18 or power output 19 of the main driver circuit 23 is monitored by the control unit 30, i.e. block 74 "Monitor main power supply at lighting device".

If the lighting device 10 is powered from the main power supply and it is established that power is available at the lighting device 10, i.e. decision "No" of decision block 75 "Power of main power supply absent at lighting device?", most probably a malfunctioning of the control unit 30 in receiving the control signal 45 and/or malfunctioning of the switching device 50 may have occurred. By continuing monitoring of the wireless control signal and continued detection of this malfunctioning, same may be signaled by an appropriate signaling through the status indicator light emitting diode 44 of the lighting device 10, for example.

However, if the result of decision block 75 is "Yes", it may be validly concluded that power of the main power supply is lost, resulting in an automatic activation of the convenience or emergency lighting mode of operation of the lighting device 10 by the control circuit 30, as indicated by block 76 "Activate powering from auxiliary power supply".

Figure 3B:
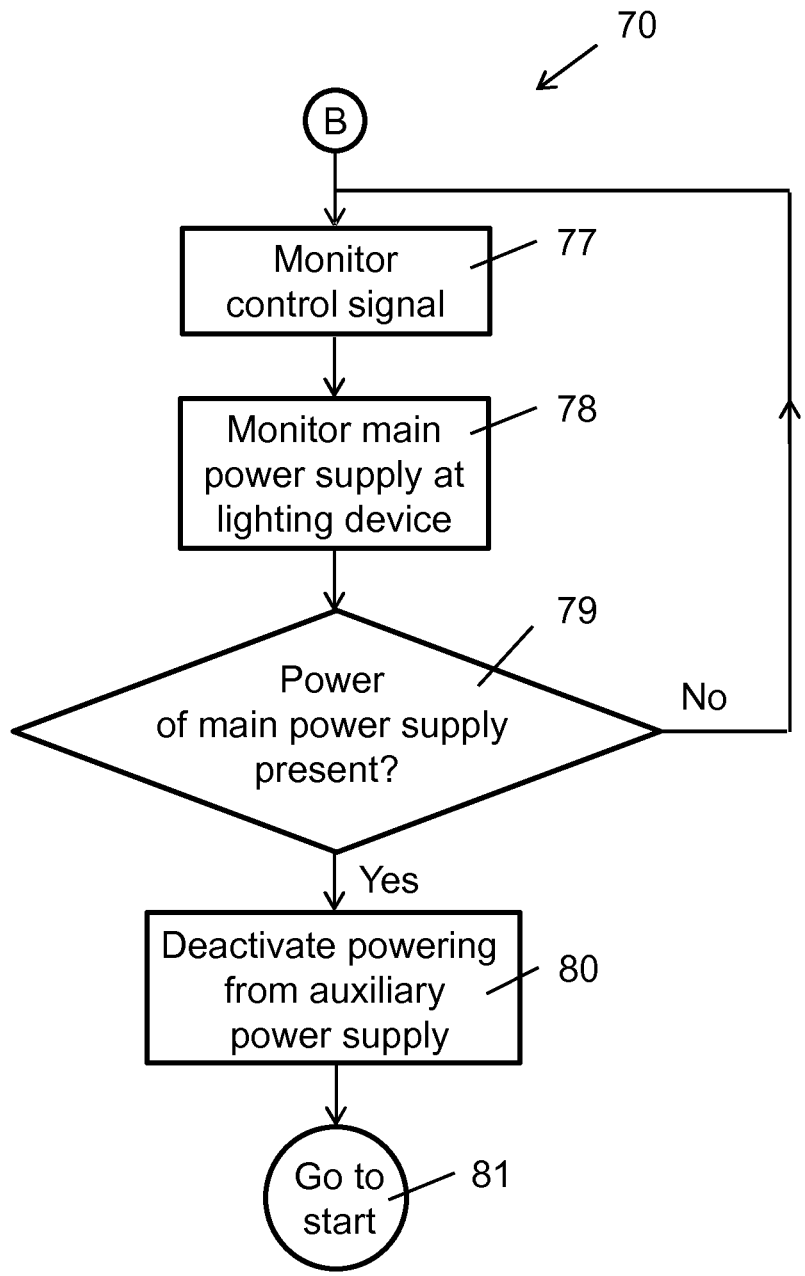

When in convenience or emergency mode, as shown in FIG. 3*b*, monitoring of the wireless control signal 45 and the power condition of the main power supply at the lighting device 10 by the control circuit 30 continues, as indicated by block 77 "Monitor control signal" and block 78 "Monitor main power supply at lighting device".

If one or both of the monitoring steps 77, 78 results in determining, by the control unit 30, that the main power supply is not yet available, i.e. result "No" of decision block 79 "Power of main power supply present?", the convenience or emergency mode of operation of the lighting device continuous and likewise monitoring 77, 78 continues.

When the main power supply becomes available or is restored again, i.e. result "Yes" of decision block 79, the convenience or emergency mode of operation of the lighting device may be deactivated, i.e. block 80 "Deactivate powering from auxiliary power supply".

In case the lighting device 10 is not powered from the main power supply, in that the switch 52 is switched off, i.e. is not in its current conducting state, the lighting device 10 will remain off. Otherwise, if the switch 52 is in its current conducting state, the lighting device will automatically resume the ambient or normal lighting operation mode.

In both cases the operation of the monitoring operation of the control unit 30 returns to the starting position, as indicated by reference numeral 81 "Go to start".

It is noted that operating the switch 52 will not invoke the convenience or emergency lighting mode of operation, although switching the switch 52 on results in switching off the transmitter 57 and thereby the wireless control signal 45, as long the main power supply remains available at the lighting device 10.

Those skilled in the art will appreciate that the monitoring operations 72 and 74 may be interchanged or performed in parallel, like the decision steps 73 and 75, for example.

Further, step 76 of activating the powering of the light emitting module 20, if comprised of a plurality of light emitting diodes 21, may comprise lighting of a reduced number 22 of light emitting diodes 21 if powered or activated to be powered 76 from the auxiliary power supply 25 compared to being powered from the main power supply.

While the invention has been illustrated and described in detail in the drawings and foregoing description, such illustration and description are to be considered illustrative or exemplary and not restrictive; the invention is not limited to the disclosed embodiments.

For example, it is possible to operate the invention in an embodiment wherein the microcontroller or microprocessor of the control circuit of the lighting device is arranged to provide a more versatile operation of the lighting device in the convenience or emergency mode of operation, for example by adapting the amount of light to be emitted dependent on the power condition of the auxiliary power supply, the amount of available ambient light, and the like, to optimize the operating time of the lighting device in its convenience or emergency mode. Instead of using a microcontroller or microprocessor, the operation of the control unit may also be implemented in an application specific integrated circuit, for example.

Although not shown, the transmitter and power monitoring circuit in the switching device may be powered from a further auxiliary power supply, such as rechargeable battery, for example. Instead of a mechanical switch as shown, semiconductor switches may be used in the switching device for switching the lighting device in its ambient or general lighting mode of operation.

Other variations to the disclosed embodiments can be understood and effected by those skilled in the art in practicing the claimed invention, from a study of the drawings, the disclosure, and the appended claims. In the claims, the word "comprising" does not exclude other elements or steps, and the indefinite article "a" or "an" does not exclude a plurality. A single processor or other unit may fulfil the functions of several items recited in the claims. The mere fact that certain measures are recited in mutually different dependent claims does not indicate that a combination of these measured cannot be used to advantage. A computer program may be stored/distributed on a suitable medium, such as an optical storage medium or a solid-state medium supplied together with or as part of other hardware, but may also be distributed in other forms, such as via the Internet or other wired or wireless telecommunication systems. Any reference signs in the claims should not be construed as limiting the scope thereof.

The invention claimed is:

1. A lighting device comprising terminals for connecting to a main power supply, said lighting device comprising:
   a light emitting module;
   a control circuit for monitoring a wireless control signal indicative of a power condition of said main power supply and for monitoring a power condition at said terminals; and
   an auxiliary power supply for powering said lighting device,
   wherein said control circuit is configured for powering said lighting device from said auxiliary power supply in response to both: a) determining, from the monitoring of the power condition at said terminals, that there is an absence of power on said terminals, and b) determining, from the monitoring of the wireless control signal, that there is an absence of receipt of said wireless control signal.

2. The lighting device according to claim 1, wherein said auxiliary power supply comprises at least one rechargeable battery.

3. The lighting device according to claim 1, wherein said light emitting module comprises a plurality of light emitting diodes, and wherein said lighting device comprises a main driver circuit for powering said light emitting module from the main power supply.

4. The lighting device according to claim 3, comprising a further driver circuit configured for lighting a reduced number of said light emitting diodes if powered from said auxiliary power supply compared to being powered from said main power supply.

5. The lighting device according to claim 1, further comprising a status indicator light emitting diode, wherein said control circuit is arranged to operate said status indicator light emitting diode indicative of at least one of a power condition of said auxiliary power supply and the power condition of said main power supply indicated by said control signal.

6. The lighting device according to claim 1, wherein said light emitting module, a main driver circuit, said control circuit, said auxiliary power supply and a further driver circuit are accommodated in a single housing configured as a retrofit tube type or bulb type solid-state light source.

7. A lighting system comprising the lighting device according to claim 1 and a switching device comprising a housing accommodating a switch for making and breaking a power line from the main power supply for powering the lighting device, said switch having second terminals for connecting said main power supply and the lighting device, a power monitoring circuit for monitoring a power condition at said second terminals, and a transmitter for wirelessly transmitting said wireless control signal, which is indicative of presence of power detected by said power monitoring circuit.

8. The lighting system according to claim 7, wherein said power monitoring circuit and said transmitter are configured for interrupting transmission of said wireless control signal in absence of power of said main power supply due to a power outage of said main power supply as well as when said switch is in a current conducting or making state.

9. The lighting system according to claim 7, further comprising a capacitive power supply unit connected across said second terminals for powering said transmitter.

10. The lighting system according to claim 7, wherein said switching device is arranged as an electric switch for flush wall mounting or surface wall mounting.

11. A lighting system, comprising at least one lighting device in accordance with claim 1 and at least one switching device.

12. A method of operating a lighting device comprising a light emitting module configured for being powered by one of a main power supply and an auxiliary power supply, said method comprising the steps of:
- monitoring a wireless control signal indicative of a power condition of said main power supply;
- monitoring a power condition at terminals of the lighting device that connect the lighting device to said main power supply; and
- powering said light emitting module by said auxiliary power supply in response to both: a) determining, from the monitoring of the power condition at said terminals, that there is an absence of power on said terminals, and b) determining, from the monitoring of the wireless control signal, that there is an absence of receipt of said wireless control signal.

13. The method according to claim 12, wherein said light emitting module comprises a plurality of light emitting diodes, wherein said powering comprises lighting of a reduced number of said light emitting diodes compared to being powered from said main power supply.

* * * * *